Nov. 23, 1948.  S. E. HILBLOM  2,454,697
TRACTOR MOWER
Filed Oct. 18, 1943  3 Sheets-Sheet 1
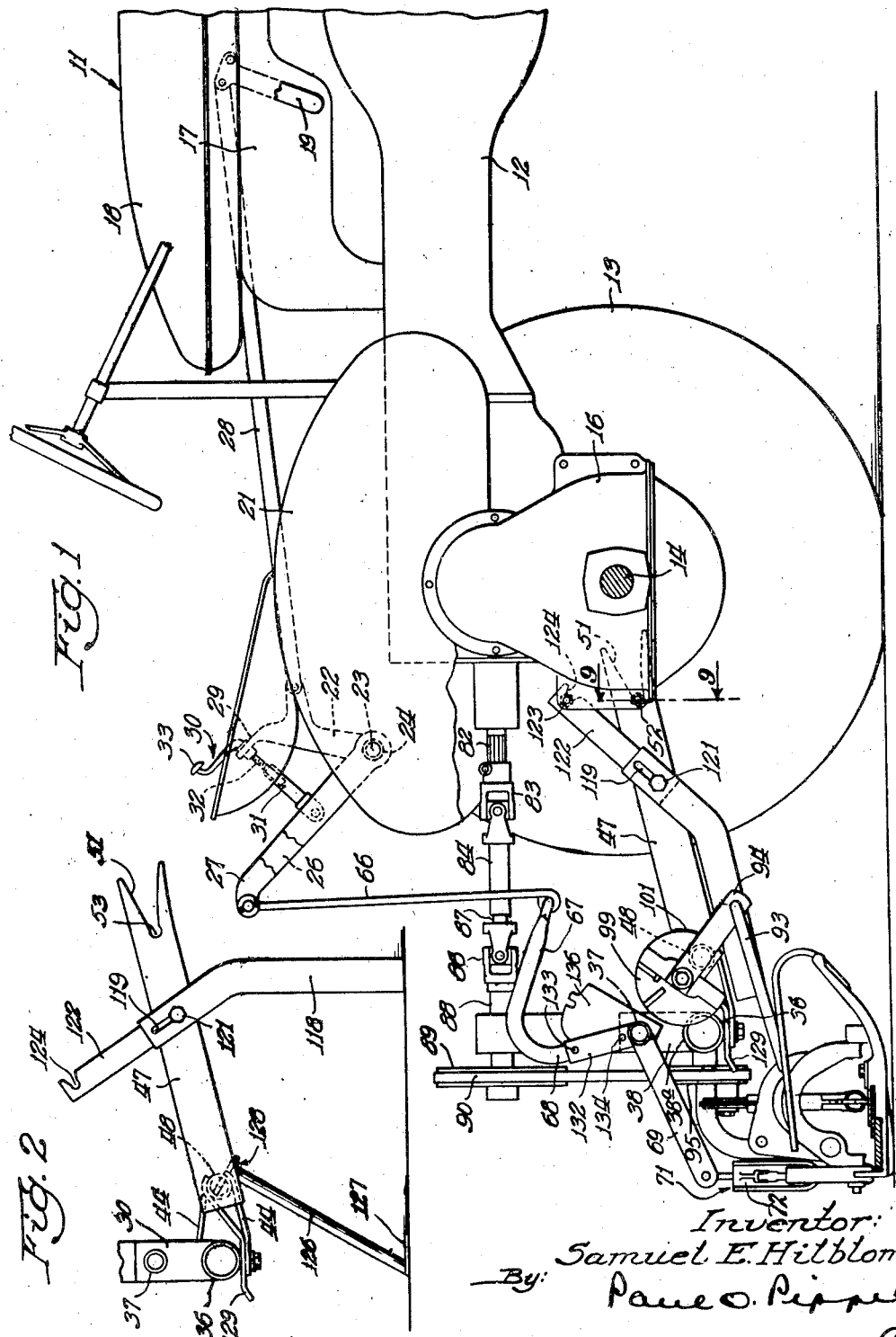
Inventor:
Samuel E. Hilblom
By: Paul O. Pippel
Atty.

Nov. 23, 1948.    S. E. HILBLOM    2,454,697
TRACTOR MOWER

Filed Oct. 18, 1943    3 Sheets-Sheet 2

Inventor:
Samuel E. Hilblom
By: Paul O. Pippel
Atty.

Nov. 23, 1948.  S. E. HILBLOM  2,454,697
TRACTOR MOWER
Filed Oct. 18, 1943  3 Sheets-Sheet 3
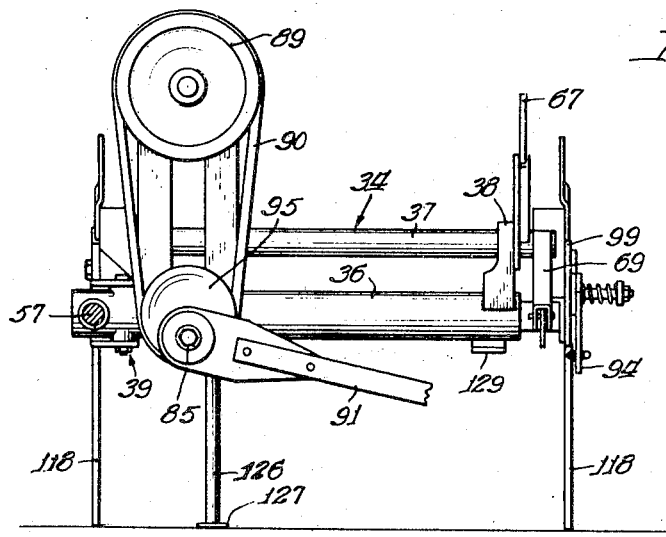
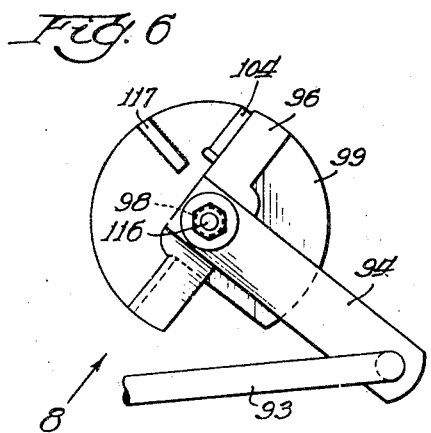
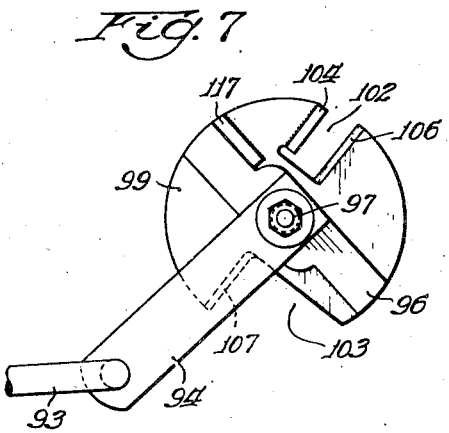
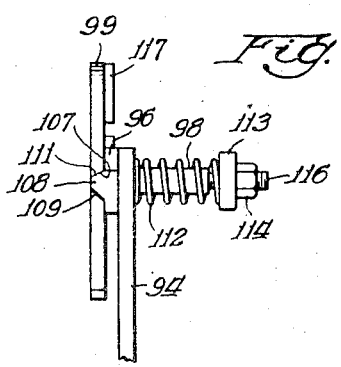
Inventor:
Samuel E. Hilblom
By: Paul O. Pippel
Atty.

Patented Nov. 23, 1948

2,454,697

UNITED STATES PATENT OFFICE 2,454,697

TRACTOR MOWER

Samuel E. Hilblom, Chicago, Ill., assignor to International Harvester Company, a corporation of New Jersey Application October 18, 1943, Serial No. 506,661

1 Claim. (Cl. 56—25)

This invention relates to a new and improved tractor mower and has for one of its principal objects provision of quick attachment means for the mower to the tractor.

An important object of this invention is to provide a mower having tubular frame construction which adds to the rigidity of the mower and its ability to withstand greater torsional strains than the presently used mowers.

Another important object of this invention is to provide a tractor-mounted mower having a mower part capable of releasing rearwardly upon the mower striking an obstruction.

Heretofore, mowers have been attached to tractors with such a high degree of permanency that it has been difficult to remove them from the tractor in order that the tractor may be used for other purposes. It is, therefore, an object of the present invention to provide a mower capable of quick and easy attachment to a tractor and likewise a quick and easy removal of the mower from the tractor. However, present day mowers cannot be mounted and dismounted on a tractor by a single person, but rather it has been necessary to employ three or even four men to accomplish a mower mounting. The subject mower overcomes this undue expenditure of labor and permits a user of this to easily effect a mower mounting without additional help.

Another and still further important object of this invention is to provide a rear mounted tractor mower compact in its structure and simpler in its manufacture and operation.

Other and further important objects of this invention will become apparent from the disclosures in the following specification and accompanying drawings, wherein:

Figure 1 is a side elevational view of the tractor mower of this invention, having one of the tractor traction wheels removed;

Figure 2 is a partial detail of the mower supporting means in ground-engaging position;

Figure 5 is a rear view of the tractor mower, showing the supporting means in ground-engaging position;

Figure 6 is a side view detail of the releasable latch intermediate the mower and tractor;

Figure 7 is a view similar to Figure 6, with the latch in extended position;

Figure 8 is a view taken on the line 8 of Figure 6; and

Figure 3:
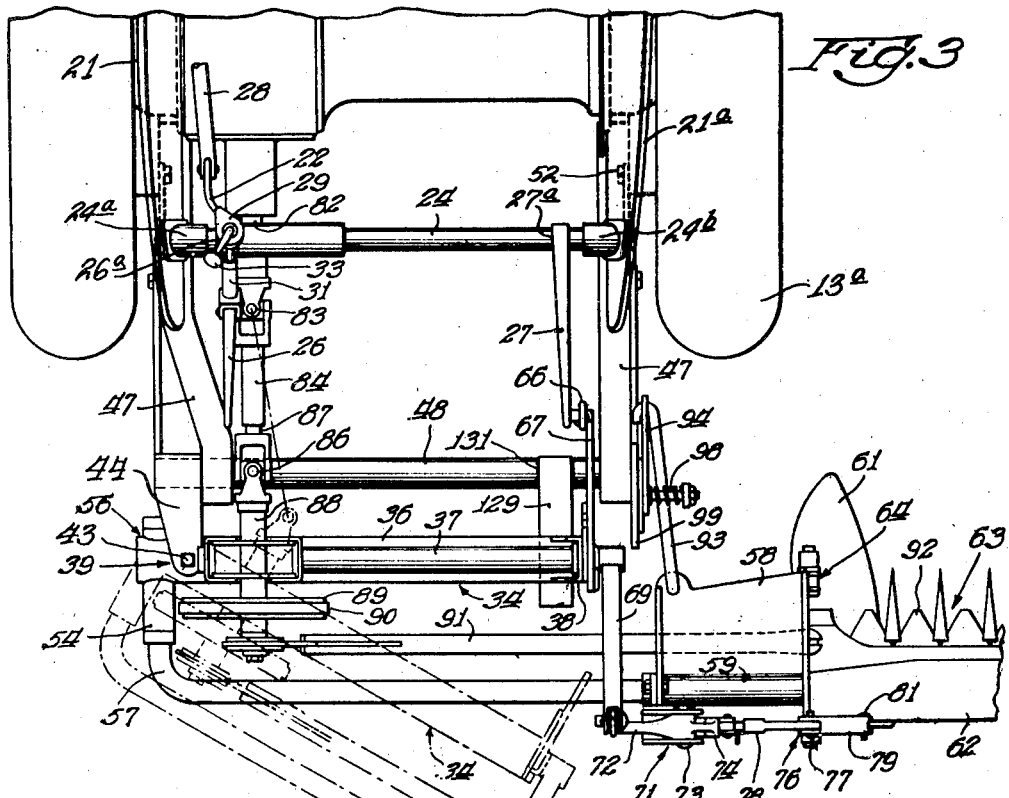
Figure 3 is a plan view of the tractor mower as shown in Figure 1.

As shown in the drawings, the reference numeral 11 indicates generally a tractor having a narrow longitudinal chassis 12 and wheels 13 and 13ª mounted on an axle 14 supported in depending axle housings 16 from the chassis 12. The tractor 11 is equipped with an engine 17 having a fuel tank 18 superposing the engine 17. In addition, the tractor 11 has a power-operated arm 19 capable of movement through an arc of substantially 90°. The arm 19 is generally controlled by an actuating lever (not shown) in the vicinity of the tractor operator, which effects some means of power operation for the rock arm 19. The traction wheels 13 and 13ª of the tractor 11 are supplied with rigid fenders 21 and 21ª capable of supporting a lever arm 22 through the medium of a rigid shaft 24, positioned across the tractor and journally mounted on the tractor fenders 21 and 21ª in bearings or bushings 24ª and 24ᵇ. The lever arm 22 is fixedly mounted at 23 on the shaft 24 and imparts rotational movement from an arm 26 to an arm 27. Upon movement of the power-operated arm 19, a connecting link 28 positioned between the power-operated rock arm 19 and the lever 22 causes similar and simultaneous movement of the arm 22 at the rear of the tractor. The arms 26 and 27 are keyed or otherwise affixed to the shaft 24 at 26ª and 27ª in the customary manner so that rotation of one automatically causes rotation of the other. An adjustment mechanism 30 is shown extending between the arm 26 and an upward extension 29 of the arm 22. The adjustment mechanism comprises an internally threaded tubular member 31 affixed to the arm 26 and a threaded bolt member 32 adapted to engage the member 31 and to be rotatable by a crank handle 33 extending through the upward extension 29 of the arm 22. Rotation of the handle 33 controls the distance between the arm 26 and the extension 29. It will be evident, therefore, that movement of the arm 22 by the power-operated arm 19 will effect a corresponding movement of the arm 26 and 27 through the adjusting mechanism. The arms 22 and 26 are substantially a bell-crank having a variable angle between the extending arms by reason of the adjustable mechanism therebetween.

Figure 4:
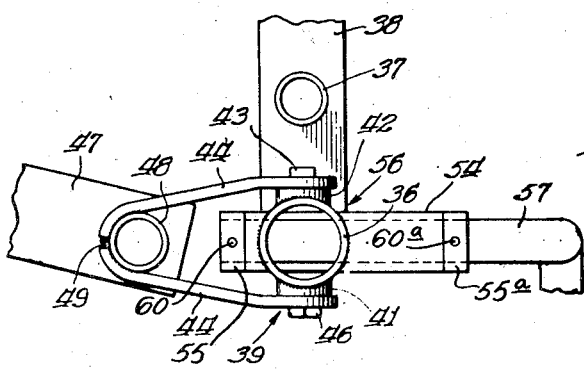
Figure 4 is a detail of the hinge between the mower and tractor.
Figure 9:
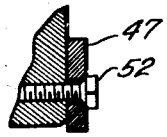
Figure 9 is a sectional view taken on the line 9—9 of Figure 1.

The mower consists of a frame 34 having tubular member 36 and 37 in parallel and vertical relationship, one to the other, and joined together by upright end members 38 which are welded at 38ª to the bottom member 36. The upper tubular member 37 is journaled for rotation within these end members 38. The member 36 is a main frame torque tube 36 and is hinged at 39, as best shown in Figure 4, wherein bosses 41 and 42 on the tube 36 are adapted to journally receive a vertical hinge pin 43 extending through alined apertures in the bosses and tube and in stationary bracket members 44. The hinge pin 43 is in the form of a bolt and has a retaining nut 46 thread- Ordinarily, the tractor is equipped with a draw-bar or other hitch means to which a mower or other implement can be attached. In the present case, the tractor is not so equipped, and in lieu of the draw-bar on the tractor the mower frame 34 embodies a pair of forwardly extending arms 47. The arms 47 are fixedly spaced apart by another tubular cross member 48, and it is on this tubular member that the hinge bracket members 44 are welded, as shown at 49 in Figure 4. It is quite evident, therefore, that the mower consists of a series of tubular cross members which are capable of withstanding the necessary stresses and strains caused by operation of the mower over rough ground or the like. The structure of the mower frame forms the subject matter of my co-pending divisional application, Ser. No. 747,037, filed May 9, 1947. The attaching arms 47, as best shown in Figure 2, are equipped with wide-mouth, V-shaped slots in the ends thereof, as shown at 51. The depending axle housings 16 of the tractor have inwardly projecting cap screws 52 which are in axial alinement with each other on each axle housing adjacent the rear traction wheels 13 and 13ᵃ of the tractor 11. The cap screws 52 are threadedly mounted on the housings 16 as shown in Figure 9 and during mounting of the mower, they are withdrawn a substantial distance but are always maintained in sufficient engagement with the housing to support the mower. The slots 51 of the arms 47 are adapted to receive the cap screws 52, and when the screw reaches a vertex 53 of the V-shaped slot 51, the cap screw is then screwed into the housing 16 to thereby lock the arms 47 rigidly with respect to the tractor. The arms 47 now act as the customary tractor draw-bar.

A short tubular longitudinal member 54 is mounted through and across the stubbleward end of the main frame tube 36, as shown at 56 in Figures 3 and 4. This tube member 54 is welded to the tube 36 at right angles and acts as a bearing support for an arm 57, which has collars 55 and 55ᵃ fastened thereto by means of pins 60 and 60ᵃ respectively. As best shown in Figure 3 the arm 57 extends across the rear of the tractor and joins a yoke member 58. The yoke 58 is equipped with a sleeve bearing 59 into which the end of the arm 57 extends. The yoke, therefore, has pivotal movement about the arm 57, but the yoke 58 and arm 57 move together up and down when the arm 57 is raised within the sleeve 54. A mower shoe 61, cutter-bar 62, and sickle 63 are hingedly attached to the yoke 58 at 64.

The mower cutter-bar is capable of several ranges of movement with respect to the tractor. The mower as a unit with the arm 57 and torque tube 36 is capable of rearward horizontal swinging about the vertical hinge 39. The mower cutter-bar is additionally capable of vertical movement as a unit with the arm 57 when the inward extension of the arm 57 is rotated within its bearing support 54, and it will be evident that it is also possible to lift the mower cutter-bar through a vertical range of movement about the hinge 64. The yoke 58, as previously stated, is rockable about the arm 57, for the purpose of obtaining proper tilt of the cutter-bar and its associated sickle 63.

The lifting of the cutter-bar about the hinge 64 is accomplished by movement of the power-lift arm 19 and a resultant downward movement of the arm 27. A connecting link 66 extends downwardly from the end of the arm 27 and is in turn joined with an angularly-shaped arm 67.

A downwardly extending portion 68 of the arm 67 is rigidly affixed to the shaft 37, which as previously stated is journaled within the end members 38. An arm 69 is also affixed to the shaft 37, and it in turn connects with the linkage 71. This linkage 71 is of standard construction and is best shown in Figure 3, wherein it is evident that an upward movement of an extension 72 of a bell-crank pivoted at 73 will cause a downward movement of an extension 74 of this bell-crank. A co-extensive bell-crank 76 is pivoted at 77 and has arm extensions 78 and 79. The extensions 74 of the first bell-crank and 78 of the second bell-crank 77 are joined together, and a downward movement of the arm 78 will cause an upward movement of the arm 79. This arm 79 is attached to the cutter-bar 62 at 81, and an upward movement of the arm 79 causes a similar upward movement of the cutter-bar and associated sickle about the hinge 64. In order to obtain an upward movement of the extension 72 of the first-named bell-cranks, the arm 27 moved by the power-lift arm 19 is moved downwardly, and this causes the member 67 to move downwardly and rotates the shaft 37, whereupon the arm 69 is moved arcuately upwardly.

The mower sickle 63 is driven from the tractor by means of a power take-off shaft extending from the rear of the tractor at 82 and is joined by a universal joint 83 to a tubular socket 84. A second universal joint 86 supports a square extension driving shaft 87 for telescopic relationship with the square tubular portion 84 of the joint 83. It is evident, therefore, that the distance between the universal joints 83 and 86 may be extended or contracted as required, and when the mower is swung rearwardly about the hinge 39, drive from the tractor is continued to the mower sickle. The other side of the universal joint 86 forms a longitudinally extending rotary shaft 88, which in turn drives a pulley 89. A belt 90 drives a pulley 95, as best shown in Figure 5, which has a crank 85 for effecting reciprocation of the pitman 91 to cause like reciprocation of the knife portion 92 of the sickle 63 of the cutter-bar 62. The mower cutter-bar 62 is normally maintained at right angles to the line of draft and extends out from the tractor, as shown in full lines in Figure 3. When the mower sickle 63 strikes an obstruction, it is desired that there be some safety means whereby the sickle and cutter-bar 63 may be released rather than have the sickle 63 damaged by a rock or the like. It is desired, therefore, that the cutter-bar 62 remain in its outwardly extending operating position until some predetermined force causes it to yield rearwardly.

The structure accomplishing this action is best shown in Figures 1, 3, 6, 7, and 8. This structure forms the subject matter of my co-pending divisional application Ser. No. 755,946, filed June 20, 1947. A connecting link 93 joins the yoke 58 of the mower to a yielding latch arm 94. As shown in Figure 6, this yielding latch arm 94 extends in a forward direction with respect to the tractor. This position corresponds to the normal operating position of the mower. Figure 7 shows the yielding latch arm 94 extended rearwardly with respect to the tractor, and it is evident, therefore, that such rearward extension corresponds to the rearward released position of the mower, as shown by the dash lines in Figure 3. The arm 94 is equipped with a cross arm 96 at one end thereof and is pivoted at 97 on a stub shaft 98 on a disk-like member 99 which is in turn welded or otherwise attached to the grassward supporting arm 47, as shown at 101 in Figure 1. It is obvious, therefore, that the disk 99 and stud are rigid with respect to the arm 47. The arm 94 is journaled on the shaft 98. The disk 99 is equipped with notches 102 and 103, which are equipped with angularly inclined walls 106 and 107. A stop 104, welded to the disk 99, is provided to prevent movement of the cross member 96 in one direction. The cross member 96 on the arm 94 is equipped with projections 108 which have inclined sides 109 and 111 which correspond in their angle to the angles in the notches 102 and 103. In normal operating position, as shown in Figures 6 and 8, the projections 108 have their inclined sides engaging the inclined sides of the notches 102 and 103. A spring 112 superposes the stub shaft 98, and by means of a large washer 113 backed up by a nut 114, the spring acts against the arm 94 tending to maintain engagement of the inclined sides 109 and 111 of the projections 108 with the inclined sides 106, and 107 of the notches 102 and 103. The spring 112 may have its compression varied by movement of the nut along a threaded extension 116 of the stub shaft 98. When the mower cutter-bar does strike some obstruction, the spring 112 may be compressed by the tendency of the arm 94 to rotate. If sufficient force is applied on the cutter-bar 62 and therefore the yoke 58, the connecting link 93 will pull the arm 94 and its cross member 96 and associated projections 108 out from the inclined sides of the notches 102 and 103, whereupon the arm 94 is permitted free rotation with its cross member 96 on the surface of the disk 99. A stop 117 is welded to the surface of the disk 99 at some strategic position such as shown to prevent full rotation of the cross member 96 and thereupon provide a final rearward yielding stop for the mower.

As best shown in Figures 2 and 5, legs 118 are provided at the extremities of the mower frame tube 36, and these legs are adapted to support the mower at a time when the tractor is driven back into the V-shaped slots 51 of the arms 47 of this mower. The legs 118 are pivoted to the connecting arms 47 within a slot 119 to permit easy extensible adjustment as the need arises and about the bolt 121 which maintains fixed engagement between the leg member 118 and arm 47 in adjusted position. The mower is not adequately supported by the bolts holding the arms 47 to the tractor, and it is, therefore, necessary to supply a supporting link between the arms 47 and some higher point on the tractor than the attaching point of the vertex 53 of the V-shaped slot 51. An upward extension 122 of the leg 118 extending at a slight angular position with respect to the leg portion is adapted to swing about the pivot cap screw 121 and engage a bolt 123 positioned above the cap screws 52 on the housing 16 of the tractor. It is quite evident that after the tractor has been backed into position, the legs 118 can be swung upwardly, and such upward swinging causes a downward swinging of the upper extension 122 of the leg 118, whereupon a notch 124 in the end of this extension 122 will engage the cap screw 123. The construction is duplicated on both sides of the tractor, and a tightening of the cap screws 52 and 123 will firmly support the mower to the tractor. An additional leg 126 is provided at the rear of the arm 47 and intermediate the sides of the mower frame, as shown in Figure 5. The leg 126 has a ground-engaging foot 127 and is pivoted at 128. The pivoting of the leg 126 is accomplished at a point on the shaft 48 at such an angle that an upward swinging of this leg 126 will cause it to lie closely adjacent and parallel to this tube 48. The mower after yielding rearwardly to the position shown in dashed lines in Figure 3, is easily returnable to its normal position by pushing the mower forwardly or backing of the tractor, whereupon the supporting tube 36 will move about its hinge 39 and slide upon a supporting member 129 which is welded to the tube 48 at 131. This supporting member 129 is best shown in Figures 1, 2, and 3.

It is believed that herein is provided a new and novel tractor-mounted mower which will prove advantageous and economical for all users thereof. Numerous details of construction may be varied throughout a wide range without departing from the principles set forth in this specification, and it is intended that the scope of the patent be determined only by the appended claim.

What is claimed is:

In a mower adapted to be quickly attached to a tractor; the tractor being provided with horizontally and vertically spaced cap screws on a fixed portion thereof; the combination comprising: a transversely disposed frame spaced rearwardly of the tractor; a cutter bar connected to said frame and extending outwardly with respect thereto; means for connecting said frame to the tractor whereby said cutter bar extends laterally outwardly with respect to the tractor including arms fixed to said frame and extending forwardly thereof in substantial alignment with certain of said cap screws; said arms having V-shaped slotted openings in one end thereof with the wide portions of said openings at the forward ends of the arms, whereby the arms at their openings may easily engage the aligned cap screws; combination brace and implement supporting members pivotally attached to the spaced arms; said members including portions extending above and below said pivotal attachment and having a V-shaped notch in the upper portion of each such member; said combination members being adapted, in one position, to have their lower portions engage the ground for supporting the arms fixed to the frame in a substantially aligned position with respect to certain of the cap screws prior to attachment to a tractor, and, in another position, to have the upper portions thereof swung into engagement with the vertically spaced cap screws on the tractor whereby the ground engaging portion is supported in an out of ground engaging position.

SAMUEL E. HILBLOM.

REFERENCES CITED

The following references are of record in the file of this patent:

UNITED STATES PATENTS

| Number | Name | Date |
|---|---|---|
| 248,969 | Whiteley | Nov. 1, 1881 |
| 2,050,518 | Baumgardner | Aug. 11, 1936 |
| 2,104,734 | Carpenter | Jan. 11, 1938 |
| 2,216,584 | Boden | Oct. 1, 1940 |
| 2,332,719 | Hilblom | Oct. 26, 1943 |
| 2,361,304 | Mappin | Oct. 24, 1944 |
| 2,377,315 | Beitzel | June 5, 1945 |
| 2,379,225 | Fraga | June 26, 1945 |